United States Patent

Corbel

[11] 3,914,617
[45] Oct. 21, 1975

[54] VERY HIGH VOLTAGE POWER SUPPLY GENERATING A RECURRENT STEPPED VOLTAGE

[75] Inventor: Ange Corbel, Paris, France

[73] Assignee: Thomson-CSF, Paris, France

[22] Filed: Nov. 26, 1973

[21] Appl. No.: 418,806

[30] Foreign Application Priority Data
Nov. 28, 1972 France ............................. 72.42259

[52] U.S. Cl. ..................... 307/56; 307/75; 307/81; 315/172; 315/242; 323/17; 323/23
[51] Int. Cl.² ............................................ G05F 1/46
[58] Field of Search ............ 307/56, 57, 58, 60, 70, 307/75, 81, 82, 83, 107, 108, 240; 315/172, 239, 240, 242, 244; 320/1; 321/2, 43, 44, 45 R; 323/17, 23, 25, DIG. 1

[56] References Cited
UNITED STATES PATENTS
| | | | |
|---|---|---|---|
| 3,490,028 | 1/1970 | Modiano | 321/2 |
| 3,543,130 | 11/1970 | Reijnders | 321/2 |
| 3,736,465 | 5/1973 | Rowe | 315/239 |

*Primary Examiner*—A. D. Pellinen
*Attorney, Agent, or Firm*—Karl F. Ross; Herbert Dubno

[57] ABSTRACT

A capacitive load, such as an accelerating electrode of a polychromatic cathode-ray tube, is energized with a recurrent stepped voltage in the VHT (very high tension) range via at least two sources of direct current. The first source is directly connected across the load capacitance through a first charging circuit including a first winding which is inductively coupled with a second winding in a discharge circuit of a second capacitance connected across the second source by way of a second charging circuit. A control circuit so times the charging and discharging of the two capacitances that the voltage of the load capacitance is held at a basic level, corresponding to that of the first source, during an initial phase of the period T of the stepped output voltage and is thereafter progressively increased to several elevated levels by the transfer of charge increments from the second capacitance, the latter being repeatedly charged within each period T during consecutive intervals followed by a final interval after the last transfer. To help stabilize the output voltage at its elevated levels, a third capacitance may be charged for brief instants from a third source and thereafter discharged, a multiplicity of times within each interval except the first, through a third winding inductively coupled with the first and second windings, thereby generating a sawtooth pattern with a constant mean voltage.

10 Claims, 4 Drawing Figures

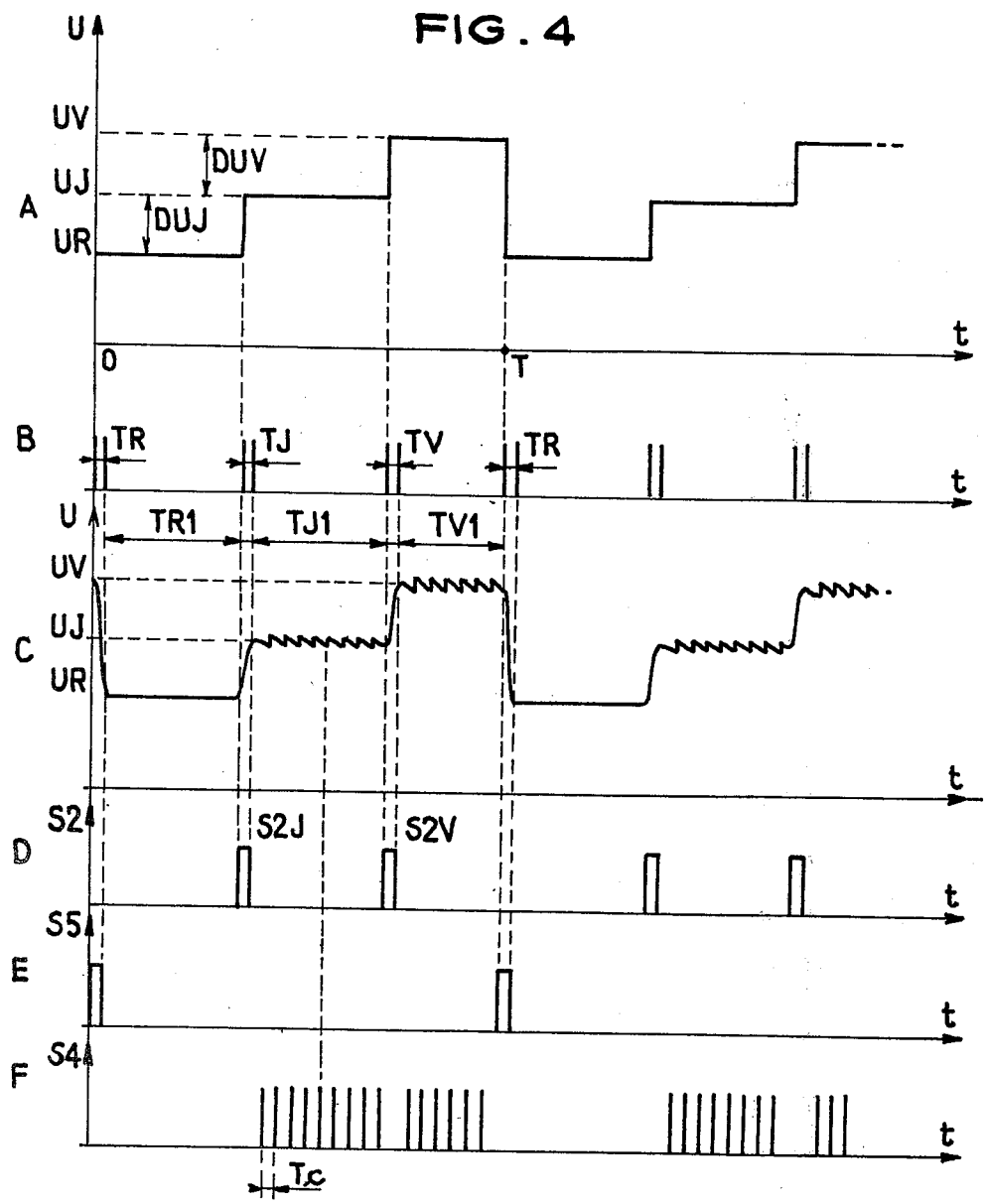

VERY HIGH VOLTAGE POWER SUPPLY GENERATING A RECURRENT STEPPED VOLTAGE

The present invention relates to a DC power supply of the switchable type designed to produce a very high tension (VHT for short) in the form of a recurrent stepped voltage with a basic level and several elevated levels.

The object of my invention is to provide a power supply of this type having essentially the following characteristics: very short dead times during switchover from one level to the next, very low losses, extreme compactness in volume, and low weight.

It is imperative that these requirements be met in on-board equipment comprising, as here particularly envisaged an electronic flight data indicator incorporating a polychromatic cathode-ray tube for display. The items of data displayed with random scanning are more easily differentiated by selecting different colors for them. For this purpose an accelerating electrode in the tube has applied to it a very high voltage which varies in steps so as to cause this selection. The duration of a voltage level may attain several tens of milliseconds. The load circuit for the power supply includes the residual capacitance present across the electrode, shunted by the tube resistance.

The above requirements cannot be provided by a power supply of simple design in which sources are connected in series-aiding or in series-opposed relationship by means of static switching devices such as thyristors, or by a power supply of more complex design applied to three-color television and designed to produce a level duration corresponding to the scanning period of a line.

The VHT power supply according to my invention meets these demands by providing means for developing a very high voltage across two output terminals whose amplitude varies in successive levels of discrete predetermined magnitudes ranging between an initial or basic level and a final level in the course of an operating cycle. The means for generating the initial value comprises a first DC source connected across a first or load capacitance through a first charging circuit including a first winding, and a normally open first discharge circuit connected in parallel with this first charging circuit. The means for generating the respective voltage steps between the successive levels comprises a second DC source connected across a second capacitance through a second charging circuit, and a second discharge circuit connected across the second capacitance, the latter circuit including a second winding inductively coupled to the first winding for transferring successive charge increments from the second capacitance to the first capacitance. The charging and discharge circuits are opened and closed in proper sequence by electrically controlled switch control.

The invention will now be further described with reference to the accompanying drawing in which.

Figure 3:
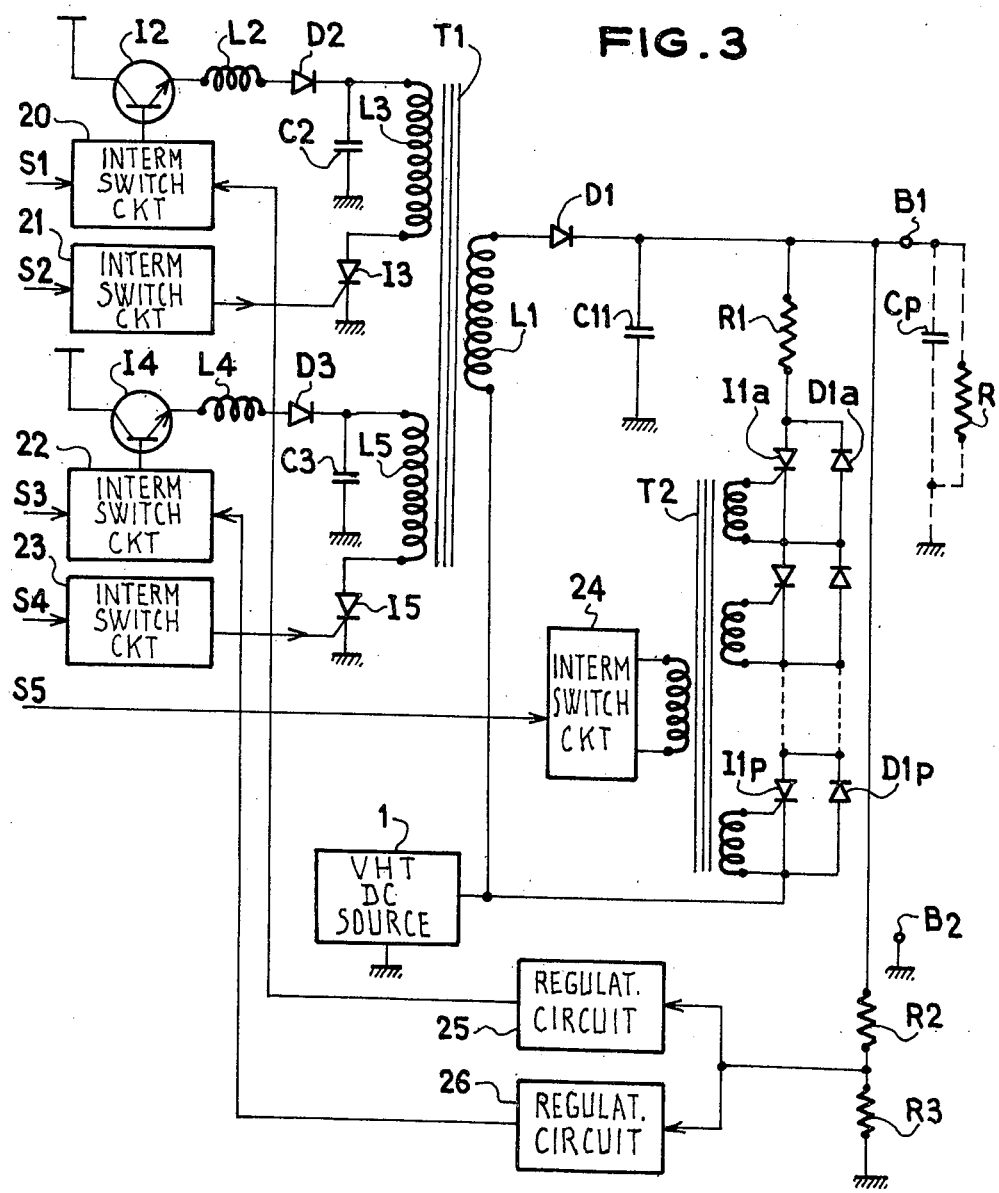
FIG. 3 is a circuit diagram of another embodiment.

FIG. 4, in a set of graphs A–F, represents various waveforms occurring in the system of FIG. 3.

Figure 1:
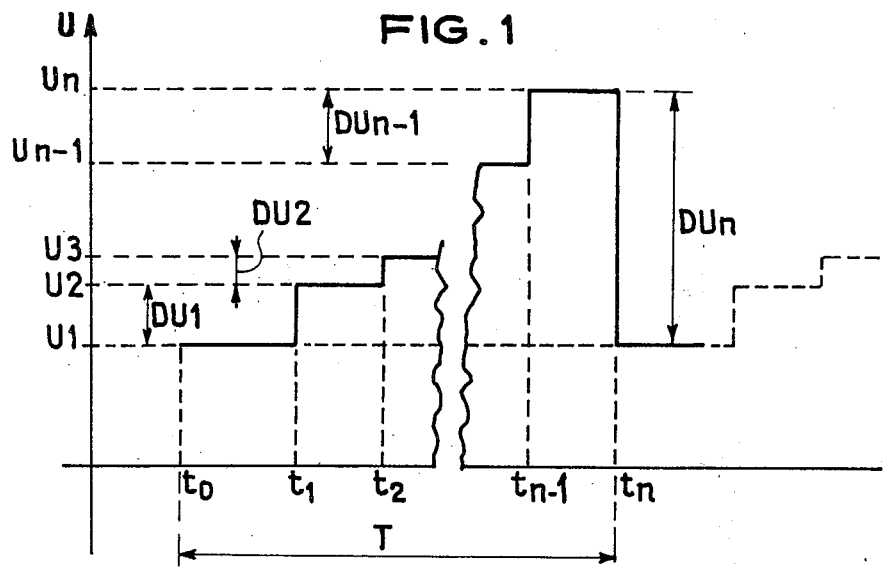
FIG. 1 is a graph showing a stepped VHT wave to be generated.

The VHT output wave shown in FIG. 1 comprises a series of voltage steps of the same polarity forming successive levels of progressively increasing magnitudes. The steep flanks of these steps enable performance to be improved from the point of view of reducing the dead times on switchover. The unipolar wave progressively changes in amplitude in a series of n increments from an initial value U1 to a final value Un in the course of a step sequence of duration T. The level differences or steps, DU1, DU2 to DUn-1, are all positive in the case shown and may be of unequal amplitude. Similarly, the switching intervals or step lengths $t_0$–$t_1$ (in the case of the first level), $t_1$–$t_2$ (in the case of the second level) etc. may also be different. Times $t_0$, $t_1$ $t_{n-1}$ correspond to the successive instants of switchover between the different steps. At the time $t_n$, when the sequence ends, a final changeover causes a return to the initial or basic level U1 by means of a single negative change DUn which is equivalent to the difference between the extreme voltage magnitudes.

The sequence may them be repeated in the same way beginning at time $t_n$, or at some later stage, depending on how the switching is controlled. The initial value U1 is fixed; the terminal value Un may vary as a function of the number of levels and of the size of the successive steps envisaged.

Figure 2:
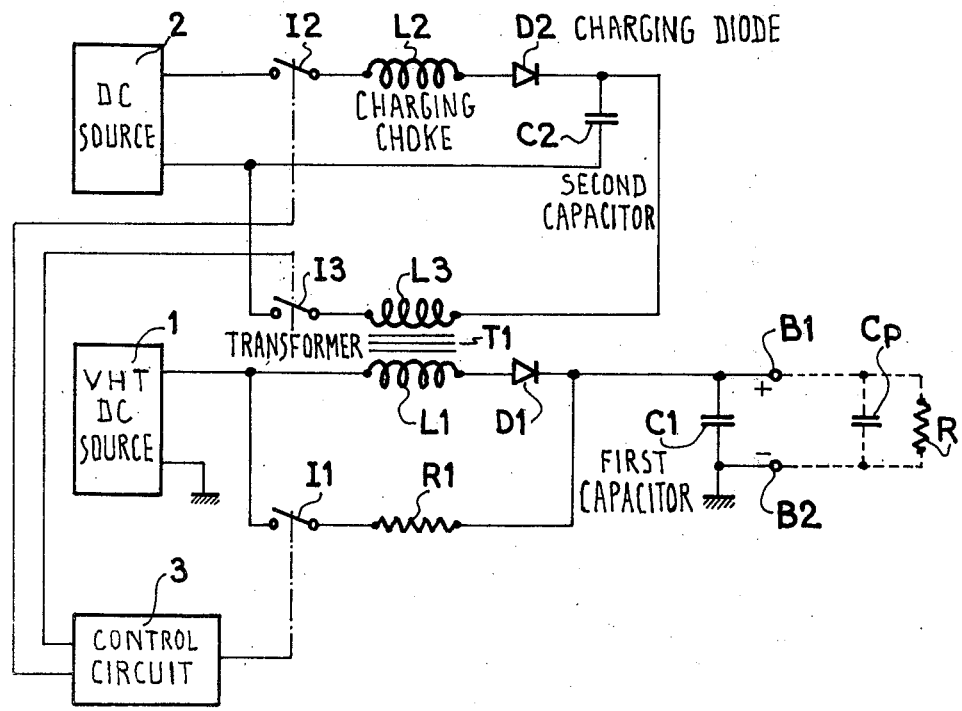
FIG. 2 is a simplified circuit diagram of a power supply according to the invention.

FIG. 2 shows a simplified circuit diagram of a DC power supply according to the invention.

The very-high-voltage output is developed across two terminals, a positive terminal B1 and negative terminal B2. It is assumed that the output voltage is positive with respect to ground, terminal B2 being grounded in the conventional manner.

The power supply includes two DC supply networks of the resonant type, each formed by a direct-current source, a charging circuit which comprises an inductance in series with a charging diode, and a capacitor. Such a circuit is frequently used to form a pulse generator, chiefly in radar modulators. The charge in the capacitor may reach a maximum value of nearly twice the voltage supplied by the source.

A first circuit of this type, used in a first network to charge a first capacitor C1 to an initial value U1, comprises a DC source 1, and inductance L1 and a diode D1 in series with capacitor C1 which is connected across the output terminals B1 and B2. It is understood that the value of capacitor C1 depends on the value of whatever capacitance Cp may exist in a load circuit Cp, R also connected across these output terminals.

A second circuit of this type comprises a DC source 2, an inductance L2, a diode D2 and a capacitor C2. This second circuit part of in a second network serving as a step generator which brings about the successive changes between levels DU1, DU2, etc . . . at the terminals of capacitor C1. To this end, it additionally incorporates a switch means I2 inserted in the charging circuit for capacitor C2, between source 2 and inductance L2. Furthermore, a discharge circuit for capacitor C2 comprises an inductance L3 which can be connected across its terminals by means of another switch means I3, both switch means being shown symbolically as circuit breakers.

The discharge inductance L3 for capacitor C2 is coupled to the charging inductance L1 for capacitor C1 by the core of a transformer T1, inductance L3 forming a primary winding and inductance L1 forming a secondary winding. The transformer T1 enables the charge in capacitor C2 of the second network to be transferred to capacitor C1 of the first network by the charging circuit L1, D1.

The first network includes furthermore a discharge circuit serving to return the voltage of capacitor C1 from the value Un which it assumes at the end of the sequence to its initial value U1. This discharge circuit is represented symbolically by a low-ohmic resistor R1 in series with a switch means, I1 also shown as a circuit breaker. The combination R1, I1 is connected in parallel with the charging circuit L1, D1 between source 1 and capacitor C1.

The switches I1 to I3 are operated by respective outputs of a control circuit 3. This circuit 3 is designed to supply the requisite switching signals which are determined beforehand in accordance with the intended change U (t) in the supply voltage. The control signals are applied, in the course of each sequence, at times $t_1$, $t_2$, . . . . $t_{n-1}$ to switch I3 and at time $tn$ to switch I1. Switch I2 is closed during the constant-voltage intervals $t_0-t_1$, $t_1-t_2$ etc. preparatorily to each new voltage step. The timing of the signals applied to the switches I1, I2 and I3 determines the respective amplitudes of the successive steps DU1, DU2 . . . . DUn.

The complexity of the control circuit 3 depends on the number of levels and thus on the number of voltage increments to be produced. This circuit is a conventional signal generator whose components are so chosen as to establish the desired amplitudes of the steps as determined by the charging rate of capacitor C2. The maximum discharge time for that capacitor, occurring upon attainment of the highest voltage level contemplated, should be short in comparison with the useful length of time for which the level in question is maintained.

The power supply described with reference to FIG. 2 answers the purpose if it is assumed that the resistance R presented by the load circuit is sufficiently high and if the duration of the levels remains short in comparison with the time constant RC1. To overcome the effects of the discharge of capacitor C1 on the load circuit and to maintain a substantially constant voltage value for each level U2 to Un, I prefer to provide a stabilizing network whose circuits are similar to those of the step generator but are switched at a more rapid rate. This stabilizing network includes an ancillary capacitor whose charge is periodically transferred to the terminals of output capacitor C1 so as to compensate for the loss of charge from the latter during each stepping interval except the first. The switching period is so calculated that the voltage variations on any level are small and acceptable for the intended purpose, e.g., less than 0.5% of the mean level voltage.

FIG. 3 shows such an embodiment which may be applied to an airborne electronic flight-data indicator in which the data are displayed on the screen of a polychromatic cathode-ray tube 30 with screen 32. By applying three successive voltages of increasing magnitude to an accelerating electrode 31, the colors red, then yellow, then green are obtained with the respective voltages. By using a larger number of voltage levels, other, intermediate shades between red and green may be obtained. In display systems of this type, the number of items to be displayed is considerable and, to avoid the phenomenon of flicker, the scanning rate must be high, with a cycle of 15 milliseconds for example. As a consequence, the the switchover times between voltage levels—when no trace is formed—should be very small.

The very-high-voltage source 1 may consists of a DC-to DC converter supplied form a local low DC voltage. The output capacitance C1 supplementing the residual load capacitance Cp present at the accelerating electrode 31, which is of the order of 100 to 200pF, is here constituted by a capacitor C11 in the supply circuit. The load resistance R represented by the tube is high, e.g. 50 megohms.

The waveform to be produced is shown in graph A of FIG. 4 with the levels UR, UJ, UV, corresponding respectively to the colors red, yellow and green; DUJ and DUV are the two differences or steps between levels. The waveform in graph B shows in an exaggerated manner the switchover periods TR, TJ and TV, for each sequence of total duration T, the available periods of utilization of the established voltage levels (graph C) being the intervening intervals TR1, TJ1 and TV1.

The stabilizing network comprises a transistor switch I4, a thyristor switch I5, inductances L4 and L5, a diode D3 and an ancillary capacitor C3. This circuit may be fed from the same source (not shown) as that which supplies the step-generator network including the analogous components I1, I2, I3, L2, L3, D2 and C2 described above. In contrast to the thyristors I3 and I5, transistors I2 and I4 are signal-responsive electronic gates whose conductivity times can be readily controlled.

The blocks 20 to 24 represent intermediate switching circuits each inserted between the control circuit 3 (FIG. 2) and the corresponding component to be controlled.

The control circuit delivers output signals S1 to S5. Via circuit 20, the signal S1 causes transistor I2 to change over from the blocked state to the conductive state in order to allow capacitor C2 to be charged. Signal S1 is produced in the course of each of the step intervals TR1, TJ1 and TV1 and its duration determines the amplitude of the next step. Signal S2 (graph D in FIG. 4) controls thyristor I3 via circuit 21 and is formed by a pulse S2J of duration TJ and a pulse S2V of duration TV. The durations of these pulses are likewise each predetermined in accordance with the magnitudes of the respective increments DUJ and DUV. The signals S3 and S4 consist of multiple pulses of constant width which recur with a predetermined spacing Tc during the intervals TJ1 and TV1 representing levels UJ and UV. The signal S3 causes capacitor C3 to be charged by unblocking transistor I4 via circuit 22. A succeeding signal S4 (graph F) operates thyristor I5 via circuit 23 and discharges capacitor C3. The signal S5 (graph E) causes capacitance C11, Cp to be partially discharged from level UV to level UR.

The final waveform obtained is shown in FIG. 4C with the switching times and the voltage-stabilizing sawteeth exaggerated.

Once a color sequence is completed, the voltage at the accelerating electrode must be swiftly restored to potential UR. The discharge circuit incorporates a conventional subcircuit formed by a stack of thyristors I1a to I1p connected in series between the output terminal B1 and the terminal of the source 1 of corresponding polarity. A resistor R1 is inserted to restrict the initial rate of discharge to a value which can be tolerated by the thyristors. The discharge time TR may be less than 20 $\mu$s. The thyristors are operated by means of an isolating transformer T2 whose primary winding is excited when signal S5 is applied to the circuit 24. The thyristors are protected against accidental overloads by means of avalanche diodes D1a to D1p whose avalanche voltage is less than the breakdown voltage of the thyristors.

A network for regulating the output voltage enables the effects of variations in the electrode current and those of ambient conditions to be overcome. This network is formed by two regulating loops comprising circuits 25 and 26 which are fed from a tap on a voltage divider R2, R3 connected across the output terminals B1, B2. The circuits 25 and 26 each produce an error voltage, on the basis of a comparison with successive reference voltages, which is applied to the corresponding switching circuits 20 and 22 so as to vary the time during which the switches I1 and I3 are open and thus to vary the charge in capacitors C1 and C2.

The switching circuits 20 to 24 and the regulating circuits 25, 26 may be constructed in various ways using known techniques. In particular, the reference voltage used for comparison purposes in each regulating circuit 25 and 26 should be of a different value depending on the level concerned; this is easily done by, for example, switching between several voltage sources, the successive switchings being brought about selectively by the control unit 3 (FIG. 1).

Source 2 (FIG. 2) may be a low-voltage DC power supply, e.g. of 150 V, in comparison with source 1 whose output voltage may be of the order of 5KV so as to produce a basic level U1 of approximately 10KV. In the field of application envisaged in conjunction with FIGS. 3 and 4, the switching times TJ and TV may easily be reduced to approximately 50 μs and time TR to 20 μs. Where the total duration T of the sequence is 15 milliseconds, as mentioned above, the overall switchover time is thus reduced to approximately 1% of this duration.

The number and magnitudes of the voltage levels may vary in accordance with the intended mode of operation and the control signals may be altered accordingly. The voltage steps are produced independently of one another and adjusting the level of one step has no effect on the other steps.

Of course the invention is not limited to the embodiment described and shown which have been given solely by way of example.

What we claim is:
1. A very-high-voltage direct-current power supply comprising:
   a load circuit including a pair of output terminals bridged by a first capacitance;
   a first network including a first DC source and a first charging circuit for said first capacitance connecting said source across said output terminals, said first charging circuit including a first winding;
   a second network including a second DC source, a second capacitance and a second charging circuit connecting said second source across said second capacitance;
   a first discharge circuit for said first capacitance shunting said first charging circuit;
   first switch means in series with said first discharge circuit;
   second switch means in series with said second charging circuit;
   a second discharge circuit for said second capacitance including a second winding inductively coupled with said first winding;
   third switch means in series with said second discharge circuit; and
   control means for said first, second and third switch means producing a recurrent stepped output voltage of period T, with a basic level and several elevated levels, by closing said first discharge circuit during an initial phase of each period T to establish said basic voltage level equal to the voltage of said first source, repeatedly closing said second charging circuit within each period T to deliver a succession of charge increments to said second capacitance during consecutive intervals, briefly closing said second discharge circuit after each of said intervals to transfer said charge increments to said first capacitance via said first and second windings for establishing said elevated levels, and holding said first and second discharge circuits open for a final interval at the end of said period T.

2. A power supply as defined in claim 1 wherein said first discharge circuit comprises a resistor, said first charging circuit including a first diode in series with said first winding, said second charging circuit including an inductance in series with a second diode.

3. A power supply as defined in claim 1 wherein said second switch means comprises a transistor.

4. A power supply as defined in claim 1 wherein said third switch means comprises a thyristor.

5. A power supply as defined in claim 1 wherein said first switch means comprises a stack of thyristors shunted by respective avalanche diodes.

6. A power supply as defined in claim 1 wherein said second switch means comprises a signal-responsive electronic gate, further comprising a voltage divider connected across said output terminals and regulating means for said gate connected to a tap on said voltage divider.

7. A power supply as defined in claim 1, further comprising a third network including a third DC source, a third capacitance, and a third charging circuit with an inductance and a diode in series connecting said third source across said third capacitance; a third discharge circuit for said third capacitance including a third winding inductively coupled with said first and second windings; fourth switch means in series with said third charging circuit operable by said control means to close said third charging circuit for brief instants recurring a multiplicity of times within each of said intervals except the first one; and fifth switch means in series with said third discharge circuit operable by said control means to close said third discharge circuit after each of said instants for a time sufficient to maintain a substantially constant mean charging voltage on said first capacitance at said elevated levels.

8. A power supply as defined in claim 7 wherein said second and fourth switch means comprise transistors and said first, third and fifth switch means comprise thyristors.

9. A power supply as defined in claim 8, further comprising a voltage divided connected across said output terminals and adjusting means for the conductivity of said transistors connected to a tap on said voltage divider.

10. A power supply as defined in claim 1 wherein said load circuit includes an accelerating electrode of a cathode-ray tube connected to one of said output terminals, said cathode-ray tube being provided with a polychromatic screen.

* * * * *